US008005779B2

United States Patent
Baeuerle et al.

(10) Patent No.: US 8,005,779 B2

(45) Date of Patent: Aug. 23, 2011

(54) SYSTEM AND METHOD FOR DESIGNING A WORKFLOW

(75) Inventors: Stefan A. Baeuerle, Rotenberg (DE); Ulrike B. Greiner, Fruthwilen (CH); Sonia Lippe, Hill End (AU)

(73) Assignee: SAP AG, Walldorf (DE)

( * ) Notice: Subject to any disclaimer, the term of this patent is extended or adjusted under 35 U.S.C. 154(b) by 804 days.

(21) Appl. No.: 11/854,406

(22) Filed: Sep. 12, 2007

(65) Prior Publication Data

US 2009/0070165 A1 Mar. 12, 2009

(51) Int. Cl.
*G06F 17/00* (2006.01)
*G06N 5/02* (2006.01)

(52) U.S. Cl. ........................................................ 706/47

(58) Field of Classification Search ..................... 706/47
See application file for complete search history.

(56) References Cited

U.S. PATENT DOCUMENTS

| | | | | |
|---|---|---|---|---|
| 5,848,393 | A * | 12/1998 | Goodridge et al. | 705/8 |
| 2004/0162741 | A1 * | 8/2004 | Flaxer et al. | 705/7 |
| 2005/0038764 | A1 * | 2/2005 | Minsky et al. | 706/47 |
| 2006/0004749 | A1 * | 1/2006 | Dettinger et al. | 707/6 |

OTHER PUBLICATIONS

Willis, J. “Introduction to the Windows Workflow Foundation Rules Engine”, Windows Vista Technical Articles, 2006, total pages 18, http://msdn.microsoft.com/en-us/library/aa480193.aspx.*

Zeng et al. “PLM flow—Dynamic Business Process Composition and Execution by Rule Inference”, LNCS, 2002, vol. 2444, pp. 141-150.*

* cited by examiner

*Primary Examiner* — Jeffrey A Gaffin
*Assistant Examiner* — Li-Wu Chang
(74) *Attorney, Agent, or Firm* — Kenyon & Kenyon LLP

(57) ABSTRACT

A method and system are provided for providing a user interface in a workflow management system. The method includes, responsive to user inputs defining a workflow in the workflow management system, displaying the workflow in a graph-based format, wherein the workflow includes a set of steps and a control flow. The method further includes deriving a set of automatically-generated rules from the set of steps and the control flow to create a rule-based format representing the workflow. There may more manual-maintained rules that are not a part of the graph or control flow, but attached to one or more steps. The method further includes executing the rule-based format workflow at a server.

25 Claims, 6 Drawing Sheets

Rules to describe start, change, cancel, complete relevant "events" for this workflow
400
402
Process (Workflow) Definition/Design Time
Design Time Models
Rule
Condition
Rules to describe dynamic behaviour of the different steps
Conditions to describe static logic known at design time
Translate to rules
410
Runtime
Start
Change
Cancel
Complete
Process (Workflow) Instance/Runtime
Rule based Execution
404
BO
406
Basic Events
408
Task/Process/Event Agent
Evaluate rules for reaction on BO changes (process dynamics)
Event
Check
Action
Check what needs to be passed to the workflow
Local/remote communication depending on engine location
Dynamic reaction; Impact of the BO changes to this process instance

150

On $event_1,\ldots,event_n$

IF $condition_1,\ldots,condition_k$

THEN DO $action_1,\ldots action_l$

ELSE DO $action_k,\ldots,action_m$

SYSTEM AND METHOD FOR DESIGNING A WORKFLOW

BACKGROUND

Generally, workflow is the movement of tasks through a work process by activity execution. Specifically, workflow is the operational aspect of a work procedure: how tasks are structured, who performs them, what their relative order is, how they are synchronized, how information flows to support the tasks, and how tasks are tracked.

In an example graph-based format workflow, activities are represented as nodes while control-flow and dependencies are represented as arcs connecting the nodes. The graph-based format workflow is visual and easy for a user to understand and manipulate. But the graph-based format workflow requires the order of activities to be fully known at design-time. In addition, execution can only occur in the order that the workflow defined.

FIG. 1A depicts an example graph-based format workflow 100. In graph-based format, a workflow is graphically defined and depicted. Activities are represented as nodes while control-flow and dependencies are represented as arcs connecting the nodes. The graph-based format workflow is visual and easy for a user to understand and manipulate. But the graph-based format workflow requires the order of activities to be fully known at design-time. In addition, execution can only occur in the order that the workflow defined.

FIG. 1B depicts an example rule-based format workflow. In rule-based format, a workflow is defined as a set of rules. Each rule is associated with a particular business process. Each business activity may be associated with a pre- and post-conditions, specified as logical expressions. All rules are defined prior to execution of the workflow. Order of execution is determined by a processing engine, and an activity is executed whenever pre-conditions become true. The rule-based format workflow is much more flexible compared to the graph-based format workflow. But rule-based format workflow is less intuitive to understand because it is not in graphical form.

A need exists to combine the two formats and provide a user interface to a workflow management system without the disadvantages of either format. Further, a need exists to have an intuitive user interface for workflows that enables easy understanding of the processes and to have the flexibility of rule-based approaches at the same time.

DETAILED DESCRIPTION

Figures 1A, 1B:
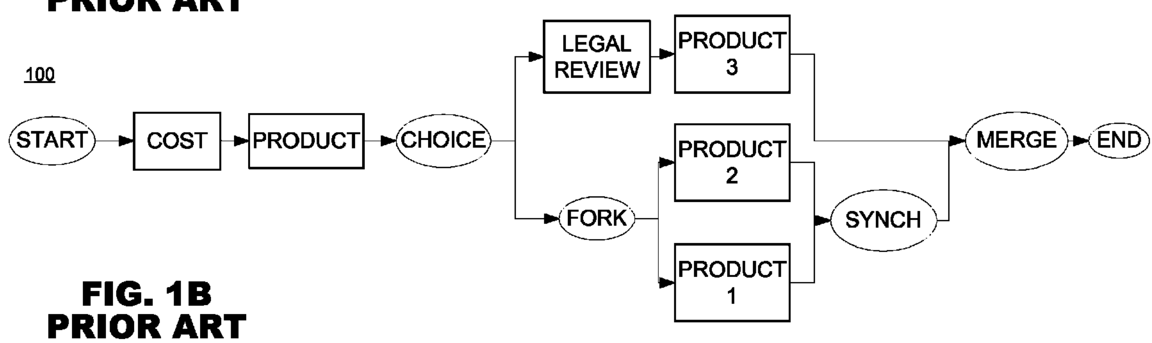
FIG. 1A depicts a graph-based model.
FIG. 1B depicts a rule-based format workflow.

A method and system is provided for providing a user interface on a workflow management system. The user interface, for example, provides graph-based workflow modeling to display a workflow to a user. The user interface utilizes rules to express flexibility requirements and exception handling. The user interface is for design time. The method and system utilize rule-based representation for execution. The rule-based representation for the runtime (or execution) may be used for internal viewing and purposes. This combines the advantages of both graph-based workflow modeling and rule-based workflow modeling.

An example embodiment of the present invention may include a method for providing a user interface in a workflow management system, the method comprising: responsive to user inputs defining a workflow in the workflow management system, displaying the workflow in a graph-based format, wherein the workflow includes a set of steps and a control flow, deriving a set of automatically-generated rules from the set of steps and the control flow to create a rule-based format representing the workflow, and executing the rule-based format workflow at a server. The automatically-generated rules may be further generated from a set of user-inputted rules. The set of steps may include interactions with at least one business object, wherein the business object models a business process and is associated a set of states and a set of operators. The method may further include, responsive to a user input changing a state of the business object, modifying the control flow. The rule-based format of the workflow may be executed responsive to a change of a state of the business object. At least one step may include a sub-workflow. The user inputs and the set of user-inputted rules may be received from a terminal over a network. The server and the terminal may communicate via web services.

Another example embodiment of the present invention may include a system for providing a user interface in a workflow management system, comprising: a network configured to carry digital information, a terminal in communication with the network, the terminal executing a client application, and a server in communication with the client application over the network, the server configured to, provide a workflow in graph-based format to the client application responsive to receiving user inputs defining the workflow in the workflow management system, wherein the workflow includes a set of steps and a control flow, derive a set of automatically-generated rules from the set of steps and the control flow to create a rule-based format representing the workflow, and executing the rule-based format workflow. The automatically-generated rules may be further generated from a set of user-inputted rules received from the client application. The server may further include a business object modeling a business process and is associated a set of states and a set of operators, and the set of steps include interactions with the business object. The server may be further configured to modify the control flow responsive to a user input changing a state of the business object. The rule-based format of the workflow may be executed responsive to a change of a state of the business object. At least one step may include a sub-workflow. The server and the terminal may communicate via web services over the network.

Another example embodiment of the present invention may include a computer-readable medium including instructions adapted to execute a method providing a user interface in a workflow management system, the method including responsive to user inputs defining a workflow in the workflow management system, displaying the workflow in a graph-based format, wherein the workflow includes a set of steps and a control flow, deriving a set of automatically-generated rules from the set of steps and the control flow to create a rule-based format representing the workflow, and executing the rule-based format workflow at a server. The automatically-generated rules may be further generated from a set of user-inputted rules. The set of steps may include interactions with at least one business object, wherein the business object models a business process and is associated a set of states and a set of operators. The method may further include responsive to a user input changing a state of the business object, modifying the control flow. The rule-based format of the workflow may be executed responsive to a change of a state of the business object. At least one step may include a sub-workflow. The user inputs and the set of user-inputted rules may be received from a terminal over a network. The server and the terminal may communicate via web services.

Figure 2:
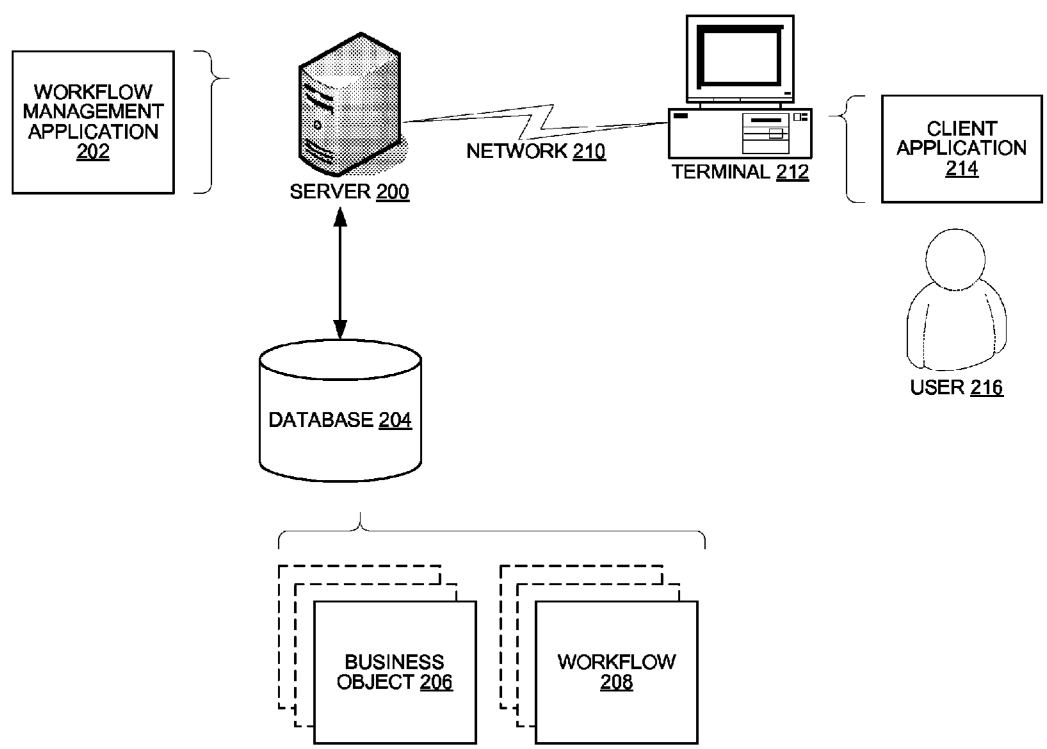
FIG. 2 depicts an example system for providing a user interface on a workflow management system in accordance with an embodiment of the present invention.

FIG. 2 depicts an example system for providing a user interface on a workflow management system in accordance with an embodiment of the present invention. The system may be provided to an administrator or supervising user responsible for defining workflows for a plurality of end users.

The system includes a server 200, which is configured to execute a workflow management application 202. The workflow management application 202 may be configured to provide a user interface.

The system includes a database 204 accessible to the workflow management application 202, for example, a relational database. The database 204 may store a plurality of business objects 206 and a plurality of workflow objects 208. A business object is a software entity that concerns a certain business functionality. For example, a business object may represent entities such as, among others, for example, PurchaseOrder, SalesOrder, Delivery. A workflow object is a software entity defining or modeling a set of steps that execute a process in the system. The steps of a workflow may be operations on business objects or can be any other data manipulation, such as a temporary data manipulation. A workflow may interact with one or more business objects during execution.

A terminal 212 may be in communication with the server 200 over a network 210. The network 210 may be a communications link configured to carry digital signals. The terminal 212 may be a computing device configured to execute a client application 214. The client application 214 may interact with the workflow management application 202. A user 216 may utilize the client application 214 to define workflows on the workflow management application 202 in defining workflows for use by an enterprise or business entity.

Figure 3:
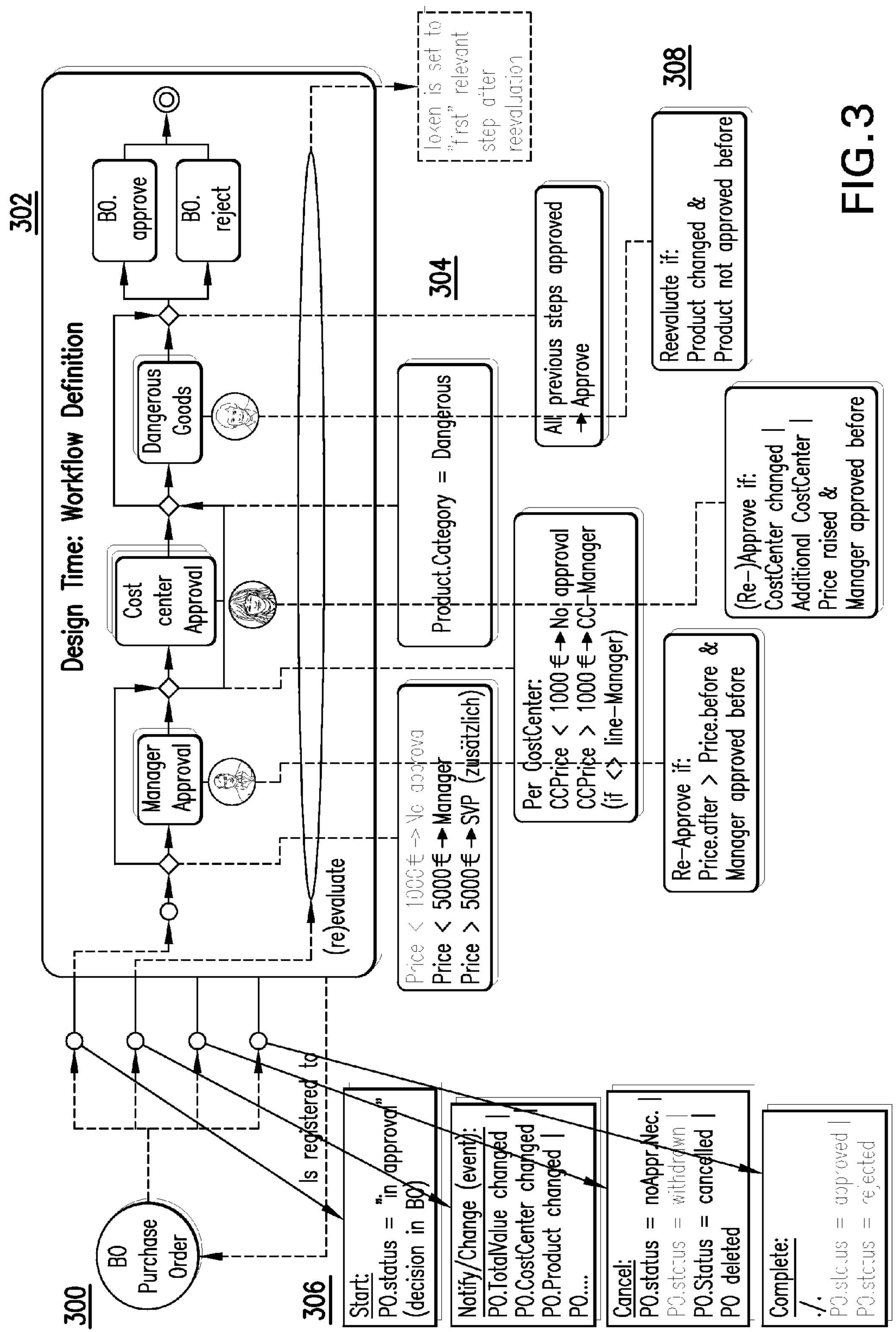
FIG. 3 depicts an example screen shot displaying a workflow modeling having rules and states in accordance with an embodiment of the present invention.

FIG. 3 depicts an example screen shot displaying a hybrid approach of an embodiment of the present invention. That is, FIG. 3 shows an example hybrid approach between graph-based and rule-based modeling. A user interface provided to assist a user defining a workflow is depicted. The screen shot may be part of a user interface provided to a user when defining a workflow on a workflow management application, as described in FIG. 1. Workflow objects and business objects are more fully described in FIG. 6.

The screen shot depicts a business object 300 provided to a graph-based format workflow 302. The business object 300 may be the purchase order, e.g., PurchaseOrder business object. The workflow represents some processing logic that operates on the business objects to fulfill a certain business goal. For example, if the business object 300 is a PurchaseOrder business object, then the workflow may represent some processing logic that operates on the business object to fulfill a specified goal of to approve the PurchaseOrder. In a further embodiment, the graph-based format workflow 302 includes a sequence of approvals by a plurality of users before the business object 300 is approved and the workflow is completed.

Rules 304 specify which steps are to be executed for the business object 300. The rules 304 may be design time rules that specify what approval step or steps are required depending upon the business object's attribute values. For example, a manager is required to approve any purchase orders less than a predetermined dollar amount, while a senior vice president is required to approve any purchase orders greater than the predetermined dollar amount. A cost center may be required to approve any purchase orders greater than a predetermined dollar amount. Special approval may be required for dangerous products. For example, this may be termed cost center approval which is required for specified circumstances by the cost center responsible. The business object 300 may be approved (and the associated workflow completed) when all required approvals have been obtained.

Workflow conditions 306 may define when the workflow is started, adapted, or cancelled. For example, the workflow is started if the business object 300 is instantiated. The workflow is adapted if any state of the business object 300 is changed. The workflow is cancelled if either the state of the business object 300 is changed so that no approvals are necessary, or the business object 300 is cancelled. The workflow is completed when an operator accept or reject is executed on the business object 300.

Once a business object changes, one must consider and figure out what this may mean for the workflow. The business rules 308 describe or specify under what condition or conditions a step or steps need to be re-executed or executed again. For example, re-approval may be required if a price increases after manager approval is given, a product is changed and the product was not previously approved, or if the price increases and manager approval was previous received. In an embodiment of the present invention, the business rules 308 is a separate set of rules for re-execution of the step or steps depending upon the business object 300 changes.

The rules 304 describe rules for the standard processing. Both rule sets 304, 308 may be evaluated on changes to determine or figure out what next step needs to be executed or re-executed.

Figure 4:
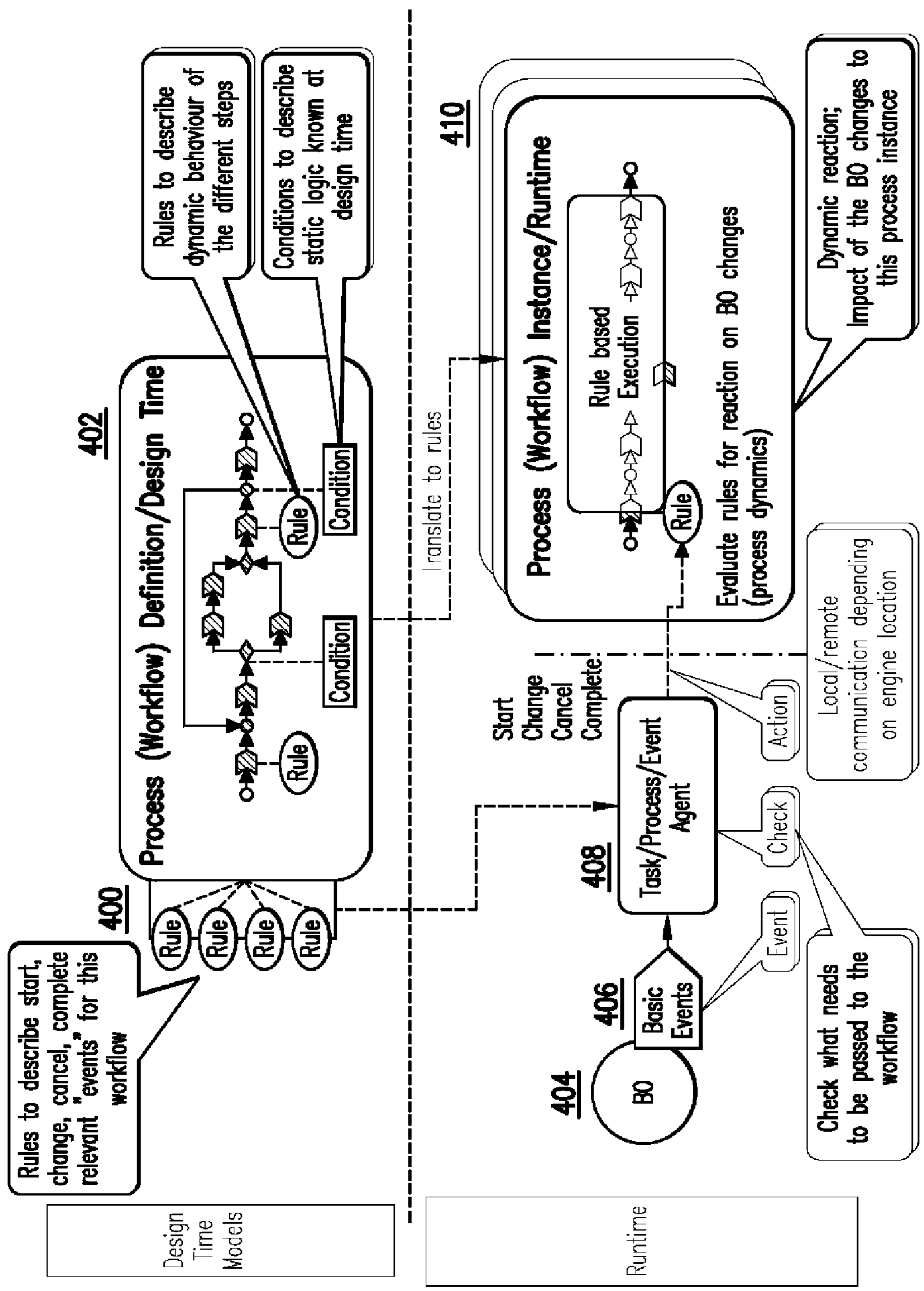
FIG. 4 depicts an example screenshot displaying a relation between design time and run time for workflow modeling in accordance with an example embodiment of the present invention.

FIG. 4 depicts an example screen shot displaying the relation between workflow design time and the translation to a workflow run time that then is executed by an engine in accordance with an example embodiment of the present invention. FIG. 4 illustrates a transition of a graph-based and rule-based system into a purely rule-based representation for runtime.

The screen shot may be part of a user interface provided to a user when defining a workflow on a workflow management application, as described in FIG. 1. Workflow objects and business objects are more fully described in FIG. 6.

In FIG. 4, the example runtime part is shown with business objects and agents. FIG. 4 shows an example hybrid approach at modeling—both graph-based and rule-based—and the translation into rules for runtime.

Rules 400 may be used to define a rule-based format workflow. For example, workflow conditions or rules 400 may define when the workflow is started, adapted, or cancelled. Rules 400 may be, for example, the rules 306 illustrated in FIG. 3. Graph 402 may be used to define a graph-based format workflow. Each step in the graph 402 may be associated with one or more rules. The one or more rules may be evaluated on changes to determine or figure out what next step needs to be executed or re-executed. These one or more rules may be, for example, the rules 304, 308 illustrated in FIG. 3. For example, the one or more rules concern standard processing and/or business rules specifying under what condition(s) a step(s) needs to be re-executed.

Rules 400 may include runtime rules and business rules.

To create a workflow object from rules 400 and graph 402, two modeling approaches may be used. Top-down modeling first creates graph-based workflow model from user input, then creates a set of runtime rules from the graph-based model. The rule set is then augmented with business rules.

Bottom-up modeling receives rules from a user, and clusters the rules in a graph to generate a graph-based format workflow for visualization. This helps users spot inconsistencies in the rule sets.

At run time, a business object 404 is processed and basic events 406 are extracted. The basic events 406 and rules 400 are provided to an event agent 408. The event agent 408 evaluates the rules 400 to decide or determine whether a new workflow is to be started and/or an existing workflow is to be changed and/or canceled. The rules 400 may be, for example, the rules 306 as illustrated and described in FIG. 3. The workflow object 410 is executed from the end user's point of view.

Figure 5:
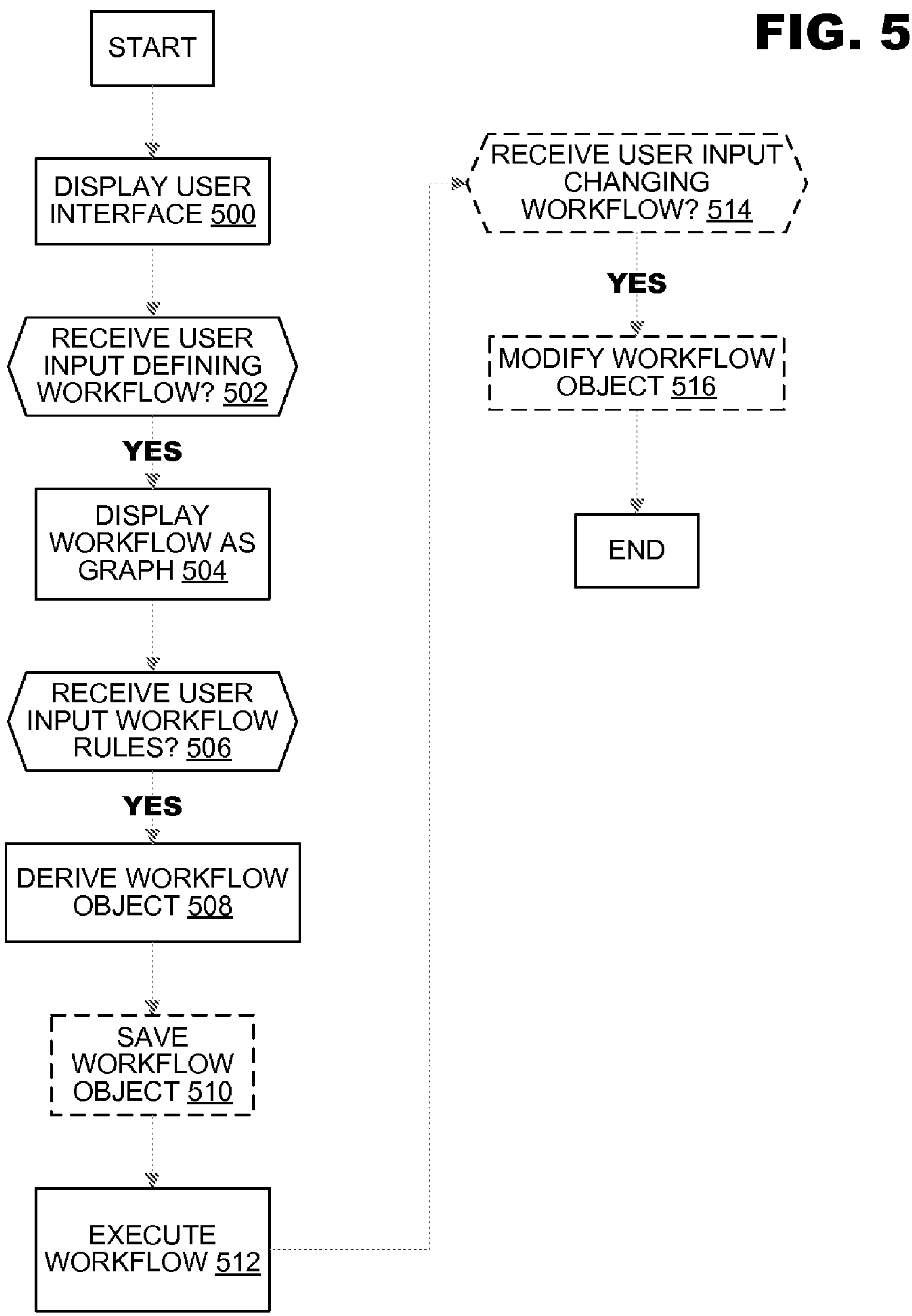
FIG. 5 depicts an example procedure for providing a user interface on a workflow management system in accordance with an embodiment of the present invention.

FIG. 5 depicts an example procedure for providing a user interface on a workflow management system in accordance with an embodiment of the present invention. The procedure may execute on a workflow management application in communication with a client application as depicted in FIG. 2 and provide a user interface to a user.

In 500, a user interface is displayed. The user interface may be configured to provide an interface for a user to a workflow management application. The user may be a supervisor or administrator responsible for defining workflows on the system. For example, screen shots of the user interface may be as depicted in FIGS. 4 and 5.

In 502, a user input is received, the user input defining a workflow. For example, the user input may include a series of pointer device clicks and data entered via keyboard or other input devices by the user responsive to screen shots as depicted in FIGS. 4 and 5.

In 504, the workflow is displayed as a graph. The user input may define a graph-based format workflow through pointer device movements and clicks and other inputs, as described above.

In 506, the procedure may receive user input defining workflow rules. The workflow rules may be logical expressions as described above and supplement the user input received 502 in defining the workflow.

In 508, the workflow management application may derive workflow objects to represent the workflow defined by the user inputs received in 502 and 506. For example, the workflow objects may be modeled by top-down modeling or bottom-up modeling, as described above.

In 510, the procedure may optionally save the workflow objects derived in 508. The workflow objects may be saved on a re-writable medium accessible to the workflow management application for future use.

In 512, the workflow may be executed by the workflow management application. For example, the workflow management application may be in communication with a second terminal and an end user, the end user executing tasks presented by the workflow.

In 514, the workflow management application may receive user input during execution of the workflow in 512 that change the workflow. If so, the relevant workflow object may be modified in 516.

Figure 6:
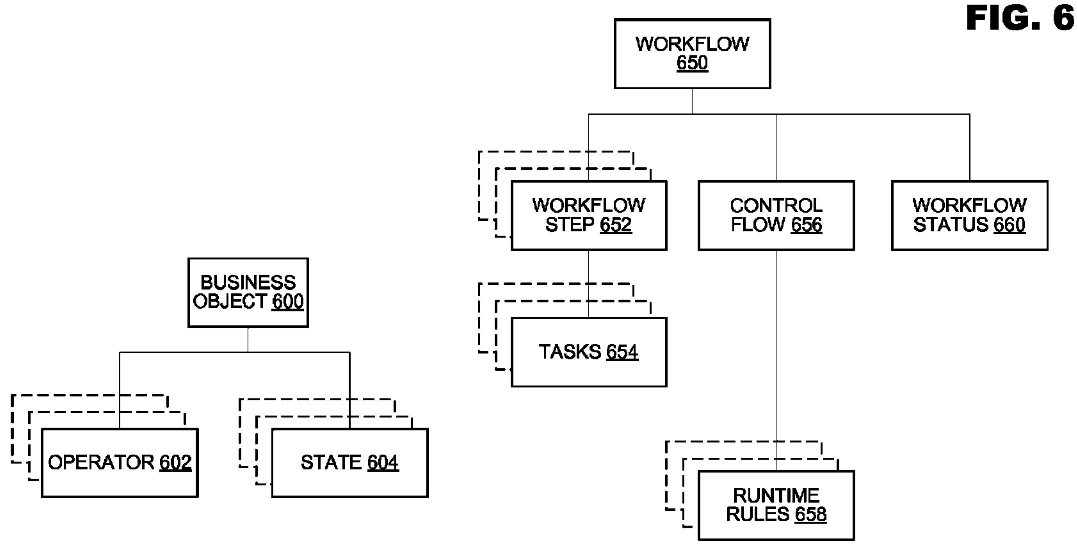
FIG. 6 depicts example data structures for providing a user interface on a workflow management system in accordance with an embodiment of the present invention.

It will be appreciated that the user may access the user interface locally at the server, instead of remotely from a remote terminal FIG. 6 depicts example data structures for providing a user interface on a workflow management system in accordance with an embodiment of the present invention. The data structures may include a business object 600 and a workflow object 650 used in a system as described in FIG. 2.

Business object 600 may include a plurality of operators 602 and a plurality of states 604. A state includes information about a business object 600. If the business object 600 is modeling a purchase order, a state may include purchase order details such as a requester's name, date of request, product to be purchased, etc.

An operator performs an operation on the business object 600 by manipulating one or more states. For example, an operator may input a requester's name, a date of request, and/or a product to be purchased, etc., if the business object 600 is modeling a purchase order.

Workflow object 650 may include a plurality of workflow steps 652. Each workflow step may be associated with one or more tasks 654. A step 652 may be one activity in a workflow or one node in a graph-based format workflow. A task 654 may be one or more actions to be executed by an end user to fulfill the step 652.

Workflow object 650 may include a control flow 656. The control flow 656 may be represented as a plurality of business rules, as described above. The control flow 656 may also include a plurality of runtime rules 658, as described above. In further embodiments, there may be other rule(s) that are attached to the graph or control flow 656 that express additional flexibility. These other rule(s) may be or may not be directly covered by the graph or control flow 656. For example, such rule(s) may be user-inputted rules. These rules may be additional rules that are not directly expressed by the graph or control flow 656 itself. In a further embodiment, this may lead to the hybrid approach of parts that are defined by the graph or control flow 656 and other parts that are defined by rule(s). Both convert into a set of rules for runtime.

Workflow object 650 includes a workflow status 660. The workflow status 660 indicates the status of the workflow, for example: not yet started, incomplete, error, completed, or other statuses.

Although the preceding text sets forth a detailed description of various embodiments, it should be understood that the legal scope of the invention is defined by the words of the claims set forth below. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should be understood that there exist implementations of other variations and modifications of the invention and its various aspects, as may be readily apparent to those of ordinary skill in the art, and that the invention is not limited by specific embodiments described herein. It is therefore contemplated to cover any and all modifications, variations or equivalents that fall within the scope of the basic underlying principals disclosed and claimed herein. The embodiments discussed above may be used in various combinations with and without each other.

What is claimed is:

1. A method for designing workflows and executing business objects through the workflows, comprising:

responsive to user inputs defining a workflow in a graphic design area of a workflow management system, designing and displaying the workflow in a graph-based format, wherein the workflow includes a set of steps and a control flow that controls execution of the set of steps;

deriving a set of automatically-generated rules from the set of steps and the control flow to create a rule-based format representing the workflow;

receiving additional rules entered by a user, the additional rules being combined with the automatically-generated rules to augment the automatically-generated rules;

responsive to receiving the additional rules entered by the user, clustering the additional rules in a bottom-up manner to form at least one graphic representation of the workflow including the additional rules;

displaying the at least one graphic representation to the user;

executing the rule-based format workflow at a server; and during the executing, changing the set of steps and control flow of the workflow responsive to a further user input defining further additional rules and modifying the workflow based on the further additional rules.

2. The method of claim 1, wherein the automatically-generated rules further incorporate a set of previously user-inputted rules.

3. The method of claim 1, wherein the set of steps include interactions with at least one business object, wherein the business object models a business functionality and is associated a set of states and a set of operators.

4. The method of claim 3, further comprising:

responsive to a user input changing a state of the business object, modifying the control flow.

5. The method of claim 3, wherein the rule-based format of the workflow is executed responsive to a change of a state of the business object.

6. The method of claim 1, wherein at least one step includes a sub-workflow.

7. The method of claim 1, wherein the user inputs and the set of user-inputted rules are received from a terminal over a network.

8. The method of claim 7, wherein the server and the terminal communicate via web services.

9. The method of claim 1, further comprising:

receiving at least one rule that includes conditions based on which the workflow is executed.

10. The method of claim 1, wherein the user determines inconsistencies in the workflow based on the display of the at least one graphic representation.

11. A system for designing workflows and executing business objects through the workflows, comprising:

a network configured to carry digital information;

a terminal in communication with the network, the terminal executing a client application; and a server in communication with the client application over the network, the server configured to, display a workflow in graph-based format to the client application responsive to receiving user inputs defining the workflow in the workflow management system, wherein the workflow includes a set of steps and a control flow that controls execution of the set of steps, derive a set of automatically-generated rules from the set of steps and the control flow to create a rule-based format representing the workflow, receive additional rules entered by a user, the additional rules being combined with the automatically-generated rules to augment the automatically-generated rules;

responsive to receiving the additional rules entered by the user, clustering the additional rules in a bottom-up manner to form at least one graphic representation of the workflow including the additional rules;

displaying the at least one graphic representation to the user;

executing the rule-based format workflow; and during the executing, change the set of steps and control flow of the workflow responsive to a further user input defining further additional rules and modifying the workflow based on the further additional rules.

12. The system of claim 11, wherein the automatically-generated rules further incorporate a set of previously user-inputted rules received from the client application.

13. The system of claim 11, wherein the server further includes a business object modeling a business functionality and is associated a set of states and a set of operators, and the set of steps include interactions with the business object.

14. The system of claim 13, the server further configured to modify the control flow responsive to a user input changing a state of the business object.

15. The system of claim 13, wherein the rule-based format of the workflow is executed responsive to a change of a state of the business object.

16. The system of claim 11, wherein at least one step includes a sub-workflow.

17. The system of claim 11, wherein the server and the terminal communicate via web services over the network.

18. A computer-readable storage medium including instructions adapted to execute a method for designing workflows and executing business objects through the workflows, the method including, responsive to user inputs defining a workflow in a graphic design area of a workflow management system, designing and displaying the workflow in a graph-based format, wherein the workflow includes a set of steps and a control flow that controls execution of the set of steps;

deriving a set of automatically-generated rules from the set of steps and the control flow to create a rule-based format representing the workflow;

receiving additional rules entered by a user, the additional rules being combined with the automatically-generated rules to augment the automatically-generated rules;

responsive to receiving the additional rules entered by the user, clustering the additional rules in a bottom-up manner to form at least one graphic representation of the workflow including the additional rules;

displaying the at least one graphic representation to the user;

executing the rule-based format workflow at a server; and during the executing, changing the set of steps and control flow of the workflow responsive to a further user input defining further additional rules and modifying the workflow based on the further additional rules.

19. The medium of claim 18, wherein the automatically-generated rules are further incorporate a set of previously user-inputted rules, wherein the set of user-inputted rules are received from a terminal over a network.

20. The medium of claim 18, wherein the set of steps include interactions with at least one business object, the business object models a business process and is associated a set of states and a set of operators, and the server and the terminal communicate via internet services.

21. The medium of claim 20, the method further including, responsive to a user input changing a state of the business object, modifying the control flow.

22. The medium of claim 20, wherein the rule-based format of the workflow is executed responsive to a change of a state of the business object.

23. The method of claim 9, further comprising in response to meeting the condition, starting the workflow execution.

24. The method of claim 9, further comprising in response to meeting the condition, cancel the workflow execution.

25. The method of claim 9, further comprising in response to meeting the condition, adapting the workflow execution.

* * * * *